United States Patent [19]

Oh

[11] 4,020,002

[45] Apr. 26, 1977

[54] NON-SCHIFF BASE FIELD EFFECT LIQUID CRYSTAL COMPOSITION

[75] Inventor: Chan S. Oh, Diamond Bar, Calif.

[73] Assignee: Beckman Instruments, Inc., Fullerton, Calif.

[22] Filed: Feb. 28, 1974

[21] Appl. No.: 446,806

[52] U.S. Cl. .............................. 252/299; 252/408; 350/160 LC
[51] Int. Cl.$^2$ ...................... C09K 3/34; G02F 1/13
[58] Field of Search .......................... 252/299, 408; 350/160 LC

[56] References Cited

UNITED STATES PATENTS

| | | | |
|---|---|---|---|
| 3,773,747 | 11/1973 | Steinstrasser | 252/408 LC |
| 3,795,436 | 3/1974 | Boller et al. | 252/408 LC |
| 3,796,479 | 3/1974 | Helfrich et al. | 252/408 LC |
| 3,815,972 | 6/1974 | Hsieh | 252/408 lc |
| 3,836,478 | 9/1974 | Green et al. | 252/408 LC |
| 3,881,806 | 5/1975 | Suzuki | 252/299 |
| 3,915,883 | 10/1975 | Van Meter et al. | 252/299 |
| 3,919,105 | 11/1975 | Katagiri | 252/299 |
| 3,923,857 | 12/1975 | Boller et al. | 252/299 |
| 3,953,491 | 4/1976 | Steinstrasser et al. | 252/299 |

FOREIGN PATENTS OR APPLICATIONS

| | | | |
|---|---|---|---|
| 807,165 | 3/1974 | Belgium | 252/299 |
| 2,252,132 | 6/1975 | France | 252/299 |
| 2,359,777 | 6/1974 | Germany | 252/299 |
| 2,502,904 | 7/1975 | Germany | 252/299 |
| 2,327,036 | 12/1973 | Germany | 252/299 |
| 2,139,628 | 2/1973 | Germany | 252/299 |
| 2,321,632 | 11/1974 | Germany | 252/299 |
| 49-34,488 | 3/1974 | Japan | 252/299 |
| 50-23,385 | 7/1975 | Japan | 252/299 |
| 49-88,791 | 8/1974 | Japan | 252/299 |

OTHER PUBLICATIONS

Gray, G. W. et al., Electronics Letters, vol. 9, No. 6, pp. 130–131, (3/22/73).

*Primary Examiner*—Benjamin R. Padgett
*Assistant Examiner*—T. S. Gron
*Attorney, Agent, or Firm*—Knobbe, Martens, Olson, Hubbard & Bear

[57] ABSTRACT

Nematic liquid crystal materials suitable for use in displays and in other liquid crystal applications comprising particular combinations of positive and negative dielectric anisotropy nematic materials are disclosed.

2 Claims, No Drawings

NON-SCHIFF BASE FIELD EFFECT LIQUID CRYSTAL COMPOSITION

CROSS-REFERENCE TO RELATED APPLICATION

Application of Ser. No. 361,333, filed May 17, 1973, U.S. Pat. No. 3,956,167, entitled LIQUID CRYSTAL COMPOSITION AND DEVICES, Chan S. Oh.

Application Ser. No. 446,807 filed concurrently herewith, now abandoned, entitled FIELD EFFECT LIQUID CRYSTAL COMPOSITIONS, Chan S. Oh.

FIELD OF THE INVENTION

This invention relates to liquid crystalline materials of organic compounds, more specifically, nematic liquid crystals suitable for display device applications. Preferably, the display devices are operable within wide temperature range — room temperature being in the middle of the range.

BACKGROUND OF THE INVENTION

There are two kinds of nematic liquid crystals; negative dielectric anisotropy nematic material and positive dielectric anisotropy nematic material. The former class of materials undergoes a dynamic scattering mode electro-optic phenomena above certain threshold voltage. In this class of material, the dielectric constant component parallel to the unique axis is smaller than the perpendicular component, thus its dielectric anisotropy is negative. In the second class of nematic liquid crystals, the dielectric constant component parallel to the unique axis is substantially larger than the perpendicular component, hence its dielectric anisotropy is positive. This latter class of materials does not undergo the dynamic scattering mode, instead will undergo dielectric realignment above a certain threshold electric or magnetic field. Thus the materials are field sensitive and its electro-optic phenomena is referred to as "Field Effect" phenomena.

The chemistry and certain of the physical and structural properties of liquid crystals have been studied (References 1–7).

Early liquid crystal chemists synthesized p-ethoxybenzylidene-p'-aminobenzonitrile. Castellano et al (Reference 10) continued the synthetic works on these compounds:

p-n-butoxybenzylidene-p'-aminobenzonitrile,
p-n-hexoxybenzylidene-p'-aminobenzonitrile
p-n-hexanoyloxybenzylidene-p'-aminobenzonitrile, and
p-n-octanoyloxybenzylidene-p'-aminobenzonitrile.

All of these compounds exist as liquid crystals only at elevated temperatures and exhibit positive dielectric anistropy. Castellano et al found that some ternary mixtures among those compounds gave mixed liquid crystal which is stable at room temperature for extended periods of time. Some pleochroic dyes dissolved in those mixtures exhibited field tunable optical color filters.

Helfrich published a new electro-optic effect, commonly referred to as twisted nematics. He utilized a positive dielectric anisotropy nematic material, and as an example, he utilized a ternary mixture of Castellano's material. The most significant point of his experiment was that the display device can be operated at relatively lower voltages, e.g., 2–7 volts AC or DC. The electro-optic effect is based on the dielectric realignment, thus no dopants are necessary and high purity liquid crystal can be utilized, which is desirable and which will ensure the longevity of the operational life of the display. In addition, electric current flow is minimal (2–3 orders of magnitude lower than those commonly found in dynamic scattering mode), which minimizes any adverse electro-chemical reaction at the liquid crystal-electrode interface. He took advantage of another unique physical characteristic of nematic liquid crystal; due to the crystalline properties of liquid crystal, the molecules tend to associate into a directional pattern on a given substrate. This phenomena has been called "alignment". It was earlier found that if a pair of clear substrates, such as a microscope slide glass, are "rubbed" with dry cotton swab unidirectionally, and a few drops of liquid crystal is enclosed between thus prepared glass plates with their rubbed surfaces in direct contact with liquid crystal, the resultant thin film of liquid crystal exhibited so called "homogeneous" alignment. Under this condition, the rod-shaped liquid crystal molecules laid down on the surface with their major molecular axes parallel to the rubbing direction. The liquid crystal molecules in the bulk also followed parallel to those at the surface by their lateral attraction. The thus obtained liquid crystal medium behaves like a giant single crystal with its unique crystal axis parallel to the rubbing direction, and many physical and optical properties parallel and perpendicular to this unique axis were different.

Now, if the two glass plates are at right angle (90°) to each other so that the rubbed direction at the inner surface of the top plate and the rubbed direction of the bottom plate makes right angle; and if a nematic liquid crystal is introduced in the thus prepared cell, a unique optical medium is obtained.

(Since this original work, many new techniques have been developed in obtaining the "Rubbing Effects", which are more amenable to manufacturing processes. Other cellulosics, synthetic or natural products, can be used instead of cotton swab. Permanently etched "micro-grooves", either by fine powder of abrasive materials, like diamond dust, or by photoetching, of the substrate give the same rubbing effects. More recently, some inorganic materials have been vacuum deposited at an oblique angle on the substrate, and have yielded excellent homogeneous alignment.)

The detailed electro-optical effects of the above "Twisted" optical medium, occurred in the following manner. As usual, the molecules at the immediate surfaces of the top and bottom plates will lie down with their major molecular axes parallel to the respective rubbing directions; however, since these directions are at 90°, with respect to each other the liquid crystal molecules in the bulk will tend, through their lateral interactions, to be conformed to the given environment. Thus the major molecular axis of the liquid crystal molecules will assume a helicoidal configuration between the top and bottom plates.

One of the most important physical properties of the above described optical medium is its ability to rotate plane polarized light by 90° as the polarized light traverses through the medium. Of course, if the imposed angle is other than 90°, the angle of rotation of the plane polarized light will vary accordingly and angles other than 90° are also found to be useful for display device fabrications.

If a linear polarizer is placed under the bottom plate, holding the direction of the polarization parallel to the rubbing direction of the bottom plate, and a flux of white light hits the bottom polarizer and is linearly polarized, it enters the liquid crystal medium without attenuation. But as the light wave front traverses the "twisted" liquid crystal medium, it follows the "directors" of the helically arranged nematic molecules and the emerging light is polarized perpendicularly with respect to the direction of polarization of the entering light. If a second polarizer is placed on top of the top plate of the cell, with its polarizing direction parallel to that of the polarizer placed at the bottom of the cell, the emerging light will be completely "extinguished". (Cells of this type have been described, see References 8–14.)

Electro-optic cells can be fabricated using a pair of glass plates with inner surfaces coated with transparent conductive film and filling the cell with a positive dielectric anisotropy nematic liquid crystal after proper surface treatment. In its quiescent state ("OFF" state), without electric power, the display appears dark in color. If an electric power of few volts (AC or DC) is applied across the two plates, the cell will appear transparent; in other words, the liquid crystal medium has lost its polarizing effect completely, thus the linearly polarized light from the bottom polarizer travels straight through the liquid crystal medium and the top polarizer without attenuation. The liquid crystal molecules undergo the dielectric realignment under the influence of the applied electric field, all the dipoles being aligned along with the field direction, which effectively destroys the quiescent helicoidal molecular arrangements. The liquid crystal layer now is called "uniaxial negative" and its optic axis (unique axis) is perpendicular to the cell surfaces. If the imposed electric potential is removed, the liquid crystal relaxes back to its helicoidal arrangement and its polarizing ability is attained quickly. Thus, the liquid crystal medium behaves like an electric controlled "light valve".

It is possible to fabricate various kinds of display devices, transmissive and reflective types. In the former case, the active segments appear clear on black background if the two polaroids are parallel and black segments on white background can be obtained with perpendicularly positioned polaroids. Ambient light source is enough to visualize, but back-lighting may be added to the display device to enhance the viewability. Reflective type displays, such as minimum power draining wrist watch displays, can utilize diffusive reflectors at the bottom of the display. The active segments will appear similar to those of transmissive mode displays, depending upon the relative position of the two polaroids. (See references 8–14 for descriptions of various liquid crystal devices of the type in which the materials of this invention are useful.)

There are several positive dielectric anisotropy nematic materials potentially useful for display devices. Castellano, Reference 13, described a homologous series of p-alkoxy and p-acyloxy-benzylidene-p'-aminobenzonitriles. These materials were used only for the electric field induced color filters but twisted nematics for field effect display devices have been described using positive dielectric anisotropy nematic materials as shown below:

A.
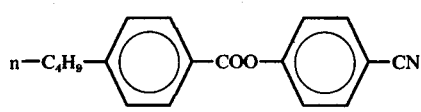

B.
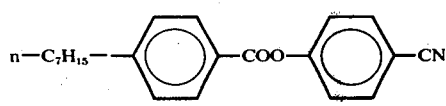

C.
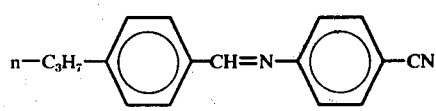

D.
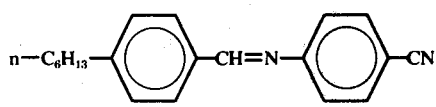

The binary mixtures A+B and C+D yield mixed nematic liquid crystals which are suitable for field effect display elements. Threshold voltage of 0.9V was obtained in the case of mixture A+B. The mixture A+B has another advantage; that is, this mixture is resistant to the chemical degradation due to moisture and is colorless, while the mixture C+D, and any other Schiff base materials, are very slightly yellow and sensitive to moisture contamination. More recently, another class of non-Schiff Base nematic materials, biphenyl derivatives, and mixtures of them were found to be useful as field effect display element.

In spite of the number of materials described, there are some more desirable material characteristics to be improved. These desirable properties include:

1. The nematic liquid crystal or mixtures should have wide nematic temperature range, including room temperature, preferably with room temperature in the middle of the range.

2. The nematic crystal or mixtures should have positive dielectric anisotropy of substantial magnitude, such that the resultant twisted nematic display device can be operated at commonly available driving voltages.

3. The electro-optic effect should start to appear at a definite voltage (Vth, threshold voltage) and reach its maximum at a slightly higher voltage (Vsat, saturation voltage) then the threshold value. Depending upon material system, Vth and Vsat change with different magnitudes by temperature changes of the surrounding environments, but these changes of Vth and Vsat should be minimal.

4. V - Vsat - Vth values for different materials indicate the sensitivity with which the materials respond to the applied voltage change. In order to obtain clear-cut electro-optic effect, which maximizes the multiplex capability of the display device, V should be minimum.

5. The materials should be chemically resistant to oxygen, moisture, ultraviolet light or electric current.

In addition, it has now been discovered that potentially serious shortcomings are inherent in the use of Schiff base materials as nematic liquid crystals. Such materials have very desirable electro-optic characteristics; however, they tend to be unstable under some conditions. Extreme care to avoid oxygen and moisture are required to obtain long term high stability liquid crystal components, and even the best practical care may not ensure a long life component. Schiff bases tend to decompose irreversibly and lose their electro-optic characteristics and, consequently, are not satisfactory materials in some liquid crystal devices. It is, therefore, desirable to provide liquid crystal materials which are less sensitive to degradation and which can be restored to a good nematic liquid crystal condition.

DESCRIPTION OF THE INVENTION

The nematic materials basically consist of single, binary, or ternary mixtures of non-Schiff base positive dielectric anisotropy material(s) and a suitable non-Schiff base negative dielectric anisotropy nematic material, which may also be of multiple components which serves as solvent. The latter materials have wide nematic temperature range including room temperature in the middle of the range, have low viscosity, and are preferably chemically stable.

It has been found that these non-Schiff base nematic solvent materials may be negative dielectric anisotropy materials and can be used without sacrificing the positive dielectric anisotropy materials and can be used without sacrificing the positive dielectric anisotropy of the solute materials to a substantial degree, in such a manner that the resultant mixtures exhibited excellent electro-optic effect as twisted nematic display element.

Many positive dielectric anisotropy materials may be used as solute material. They may be enantiotropic (or monotropic) liquid crystals or molecules structurally and chemically compatible with the solvent nematic liquid crystal. Some structurally compatible molecules readily dissolve into nematic liquid crystal without destroying nematic phase; that is, without lowering the nematicisotropic transition temperature of the solvent nematic liquid crystal substantially, but these solute molecules can modify the physical properties of the solvent nematic material. The preferred solute materials contain a cyano functional group directly linked to aromatic ring, and at least two benzene rings which are connected by a double bond. These molecules are essentially rod shaped, relatively rigid, and compatible with the preferred solvent nematic materials, which will be elaborated in detail in the following paragraphs The cyano functional groups render these types of molecules with positive dielectric anisotropy. These non-Schiff base materials can be intermixed among them without adverse chemical reactions or loss of dielectric anistropy. Thus, these solute molecules of enantiotropic, monotropic liquid crystals or nonliquid crystalline nature, or intermixtures between them, can be dissolved in appropriate nematic solvents and the resultant mixture still has useful nematic temperature ranges and desired positive dielectric anisotropy suitable as display device elements. All the known positive dielectric anisotropy nematic liquid crystals, including the above listed materials and intermixtures thereof, do not have desirable nematic temperature ranges. Thus, the nematic solvents are utilized mainly to reduce the crystal (or solid) nematic transition temperature, and to reduce the viscosity, which will modify the response times.

Many negative nematic liquid crystals can be used as nematic solvents. Unfortunately, many of the well known nematic liquid crystals or mixtures with desirable temperature range are negative dielectric anisotropy materials. As it was discussed in the introductory part, oriented liquid crystal materials, e.g., uniformly oriented nematic film being a single giant crystal, have two dielectric constants which are different in magnitude depending upon different materials. The dielectric constant perpendicular to the unique axis of the nematic crystal film (usually the unique axis is almost parallel to the longer axis of the aligned nematic molecules) is designated $\epsilon \perp$, and $\epsilon \parallel$ designates the dielectric constant parallel to the unique axis. In a given nematic material, if its $\Delta\epsilon = \epsilon \perp - \epsilon \parallel < 0$, this material is characterized as negative dielectric anisotropy material. The magnitude of $\Delta\epsilon$ for most of the known negative dielectric anisotropy nematic materials are relatively small, e.g., $-0.5$ to $-2.0$. On the other hand, if $\Delta\epsilon > 0$, the material is a positive dielectric anisotropy material and many of the positive dielectric anisotropy materials had high values, e.g., $+10$ to $+20$. Theoretically, it has been predicted that materials with positive $\Delta\epsilon$ would give rise to the field induced dielectric realignment; in other words, be useful as display elements in twisted nematic field effect display devices. The threshold voltage dependence on $\Delta\epsilon$ is shown in the following equation:

$$\frac{1}{4\pi} \Delta\epsilon \, V_c^2 = k_{11}\left(\frac{\pi}{2}\right)^2 + (k_{33} - k_{22})\left(\frac{\pi}{2}\right)^2$$

$k_{11}, k_{22}, k_{33}$ are materials elastic constants
$V_c =$ threshold voltage Thus, in order to have the threshold voltage in the commonly accessible range (e.g., 1 to 10V rms), (the required cell thickness would be in the 6 to 25 micron thick range), the value of $\Delta\epsilon$ must be at least in the range of 10 to 1, provided that all the other physical constants do not vary considerably. Thus, it is conceivable to make mixtures between "strongly" positive and "weakly" negative dielectric anisotropy materials. Since the magnitude of $\Delta\epsilon$ of the solute (positive dielectric anisotropy) is far greater than that of the solvents (negative dielectric anisotropy), less solute material (2 to 35%) can be utilized in order to obtain acceptable averaged $\Delta\epsilon$ value which is yet within the desirable range. By proper choice of solute and solvent combination, many positive dielectric anisotropy nematic mixtures with desirable nematic temperature range, desired $\Delta\epsilon$ value (or threshold voltage), and low viscosity, which will reduce the $\Delta V$ - Vsat - Vth value, can be obtained, according to the principles of this invention.

SOLVENTS

Solvents suitable for use in preparing the nematic liquid crystals of this invention are those materials classed as weakly negative dielectric anisotropy nematic non-Schiff base materials.

The preferred solvents include the following compositions:

1. Compounds selected from the group of compounds having the general formula:

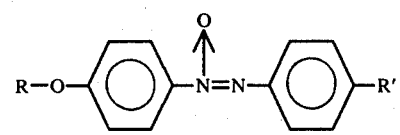

in eutectic mixture with corresponding compounds having the general formula:

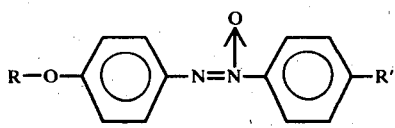

wherein, in each class of compounds R and R' are lower alkyl groups having from 1 to 4 carbon atoms, corresponding compounds being those compounds in which R is the same in both compounds and R' is the same in both compounds.

2. Combinations of two eutectic mixtures as set forth in Paragraph 1 above, R and R' in one such eutectic mixture being different from R and R' in the other of said eutectic mixture in combination.

3. Compounds selected from the group having the general formula:

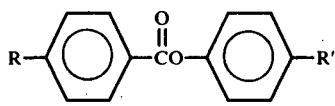

wherein R is lower alkyl group having from 1 to 7 carbon atoms when R' is a lower alkoxy group having from 1 to 7 carbon atoms and wherein R is a lower alkoxy group having from 1 to 7 carbon atoms when R' is a lower alkyl group having from 1 to 7 carbon atoms.

4. Compounds selected from the group having the general formula:

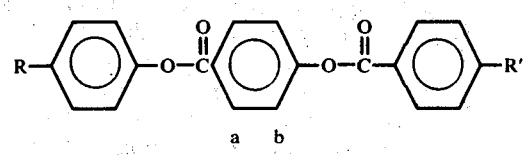

wherein R and R' are lower alkyl groups having from 1 to 7 carbon atoms and $a$ and $b$ may both be H- either $a$ or $b$ may be Cl-.

SOLUTES

Solutes suitable for use in preparing the nematic liquid crystals of this invention are those materials classed as strongly positive dielectric anisotropy nematic non-Schiff base materials.

Specific solutes include the following compositions:

1. Compounds selected from the group having the general formula:

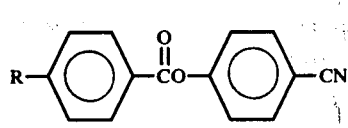

wherein R is a lower alkyl group or lower alkoxy group having from 1 to 7 carbon atoms and mixtures of two or more compounds selected from said group having differing alkyl or alkoxy chain lengths.

2. Compounds selected from the group having the general formula:

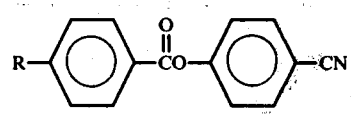

wherein R is a lower alkyl group or lower alkoxy group having from 1 to 7 carbon atoms and mixtures of two or more compounds selected from said groups having differing alkyl or alkoxy chain lengths.

3. Compounds selected from the group having the general formula:

wherein R is a lower alkyl group or lower alkoxy group having from 1 to 7 carbon atoms and mixtures of two or more compounds selected from said group having differing alkyl or alkoxy chain lengths.

SPECIFIC EXAMPLES

The following examples illustrate various specific compositions but do not comprehend the numberless combinations which are within the scope of the invention.

EXAMPLE 1

Very attractive solute compositions are prepared by mixing in the 40:60 percent to 60:40 percent range two members of the class of compounds having the general formula:

wherein R is a lower alkyl group having from 1 to 7 carbon atoms Examplary of such compositions are 40:60 and 60:40 mixtures of such compound wherein R = 3 or R = 4 with such compound wherein R = 7. Either of these solute compositions gives an excellent nematic liquid crystal material when dissolved in the 3 percent to 35 percent range in one of the solvents non-Schiff base described herein. Such liquid crystal materials are stable for an indefinite period of time of as yet unknown duration which greatly exceeds the normal effective life of Schiff base liquid crystals.

EXAMPLE 2

Equal amounts of p'-cyanophenyl-p-n-heptylbenzoate and p'-cyanophenyl-p-n-butylbenzoate mixed to form a solute in 20 percent concentration, by weight, in a solvent made up of a eutectic mixture of

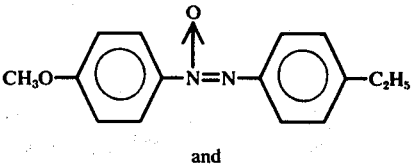

and

-continued

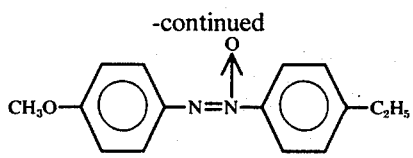

combined with a eutectic mixture of

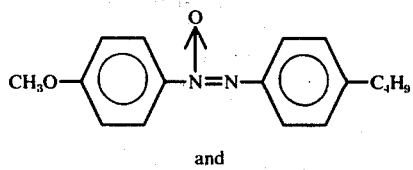

and

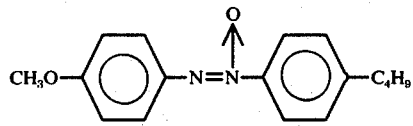

(E. Merck's Licrystal Nematic Phase 5) resulted in an excellent nematic liquid crystal material which has a long term stability of indefinite duration.

The electro-optical properties of the above mixture is shown below. (3 sq. cm. area, 12.5 micron thick.) All the data were taken at room temperature (25° C.).

| Bulk Resistivity (ohms cm.) | (pf) $C_{11}$ Cl/195 | Capacitance[1] | | Response Times[4] (milliseconds) | | |
|---|---|---|---|---|---|---|
| | | $Vth^2$ | $Vsat^3$ | Delay | Rise | Decay |
| | | (V rms 60 Hz AC) | | | | |
| $3.7 \times 10^{11}$ | 3250/5000 | 1.6 | 2.4 | 60 | 40 | 200 |

Notes:
[1]$C_{11}$ indicates the capacitance measured when the device is fully activated; e.g., above its Vsat. $C_\perp$ indicates the capacitance measured below its Vth.
[2]Vth: Threshold voltage; voltage at which the photomultiplier reading reaches 5% transmittancy when viewed at normal angle.
[3]Vsat: Saturation voltage; voltage at which the photomultiplier reading is 95% from its "steady-state" value.
[4]Delay Time: The time span between the signal "on" and the time at which the photomultiplier reaches 5%. Rise Time: The time span between 5% to 95% changes of the photomultiplier readings. Decay Time: The time span between 95% to 5% changes of the photomultiplier readings.

EXAMPLE 3

Suitable nematic, either monotropic or enantio-thermotropic, solvent materials have been chosen from the homologous series of the formula

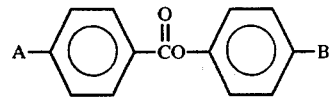

It was found those compounds with $A = n—C_7H_{15}$, $B = —OCH_3$; $A = n—C_3H_{13}—O—$, $B = —n—C_4H_9$; $A = n—C_6H_{13}—O—$, $B = —n—C_5H_{11}$; $A = n—C_4H_9$, $B = O-n-C_6H_{13}$, were suitable. This series of compounds were reported for the first time, by M. E. Neubert, L. T. Carlino, R. D. 'Sidocky and D. L. Fishel at Kent State University to an NSF Grant No. GH-34164-X.

As another component of the solvent nematic material, one of the following three compounds were used with equally good results:

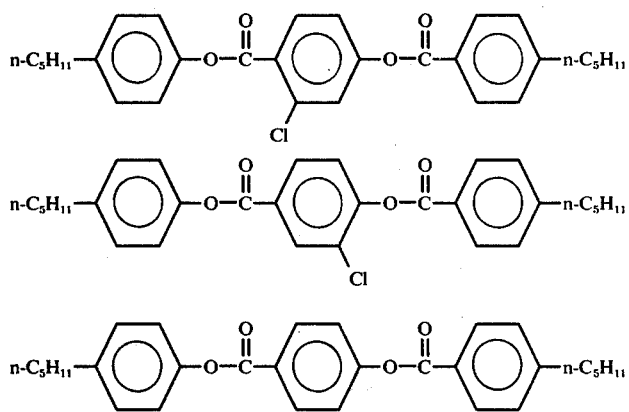

These three compounds have extremely wide nematic temperature ranges and hence used in this system mainly to improve the operational temperature ranges of the display devices. This will obviously also improve the storage temperature ranges of the product. These three compounds were published in Eastman Organic Chemical Bulletin, Vol. 45, No. 1, 1973.

EXAMPLE 5

Non-Schiff base solute materials were added to the solvent compositions of Examples 3 and 4. One such material is the compound

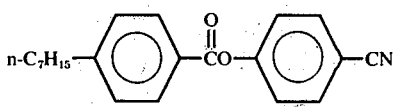

in the 2 to 50 percent, and preferrably in the 3 to 20 percent range of concentration. These compositions had good electrooptical characteristics in the desired liquid nematic temperature range.

EXAMPLE 6

One material consisting of 0.2762 part of 4'-n-butylphenyl-4-n-hexyloxybezoate, 0.2762 part of 4'-methoxyphenyl-4-n-heptylbenzoate, 0.2762 part of 4'-pentylphenyl-4-n-hexyloxybenzoate, 0.1382 part of 4'-n-pentylphenyl-3-chloro-4-(4'-n-pentylbenzyloxy)-benzoate and 0.0332 part of 4'-cyanophenyl-4-n-heptylbenzoate, exhibited suitable electro-optical characteristics to be used in any twisted nematic field effect display devices.

The electrical resistivities of the display cells made of the above formula did not deteriorate substantially over a prolonged period of time, even with organic plastic peripheral sealing display device cells. Under extremely high humidity ambient, the electrical resistivities decreased at much slower rate as compared with those cells made of Schiff base materials, however, the process was reversed as soon as the cells were stored at normal ambient conditions and reversed at a much faster rate in slightly heated dry atmosphere. On the contrary, those devices constructed from Schiff base material, under identical test conditions, never exhibited these resistively reversal processes.

In general solute concentrations from about 2 percent to about 50 percent were suitable, with the 3 to 35 percent range being most usable and the 3 to 20 percent concentration range giving the best results in terms of both liquid nematic temperature range and electro-optic characteristics.

The foregoing examples illustrate the great advantage of using the compositions of the invention and it will be apparent that within the materials available and the concentration ranges suitable an almost infinite variety of liquid crystal compositions can be formulated by blending solute and/or solvent constituents and varying the concentrations of the individual components in the compositions.

In its broader aspects, the present invention contemplates all compositions which include a solute which comprises a strongly positive dielectric anisotropy nematic liquid crystal material in concentrations of from about 2 percent to about 50 percent, and preferrably in about the 3 to 35 percent concentration range, in a solvent which comprises a weakly negative dielectric anisotropy nematic liquid crystal material which combination has the following properties:

1. The compositions exhibit nematic characteristics in the normal room temperature range and the nematic condition extends above and below that range far enough to encompass normal ambiant conditions for conventional use in display units. Typically this would include temperatures as low as perhaps 15° or 20° C. to as high as perhaps 35° or 40° C., although a somewhat narrower range would be quite satisfactory if the center of the range approximates normal room temperature.

2. The solute must exhibit strongly positive dielectric anisotropy; i.e., the positive dielectric anisotropy of the solute must be strong enough to give the final composition a positive dielectric anisotropy when the solute constitutes less than half of the total composition, and preferrably when the solute constitutes only about 1/50 to 1/3 the total composition, on a molar basis.

3. Within its nematic temperature range, the composition must exhibit electro-optic behavior in conventional display devices, e.g. of the type disclosed in references 8 through 14 when voltages achievable in and compatible with solid state electronic devices. This would generally encompass voltages from a fraction of a volt, e.g., as low as 0.1 volt to as high as 20 volts, although higher voltages could be used. D.C. voltages or A.C. voltages up to 10 kilohertz would conventionally be used.

Without limiting the operating range or the types of devices in which the compositions of this invention may be used, a typical device might be one of those devices described in U.S. Pat. Nos. 3,731,986, or 3,322,485, just to select examples, in which the thickness of the nematic liquid crystal material might be from less than 6 $\mu$ to somewhat greater than 25 $\mu$ and which might exhibit electro-optic properties under applied threshold voltages of from as low as 0.2 volts to as high as perhaps 7 or 8 volts.

Included within the invention are the specific materials, and their equivalents, and the various combinations and mixtures of these materials which would fall within the scope of the claims as set forth hereinafter.

REFERENCES CITED IN THE SPECIFICATION

The following patents and publications are incorporated herein as background material and no representation is made respecting pertinence or completeness:

1. Brown, G. H., CHEMISTRY, 40, 10 1967.
2. Brown, G. H., ANAL. CHEM., 41, 26A 1969
3. Brown, G. H., Shaw, W. G., CHEM. REV., 57, 1049, 1957.
4. AMERICAN CHEMICAL SOCIETY. ORDERED FLUIDS & LIQUID CRYSTALS. (Advances in Chemistry. Ser., No. 63) 1967. 11.50 (ISBN 0-8412-0064-5) Am. Chemical.
5. Brown, G., et al. LIQUID CRYSTALS PROCEEDINGS OF 1965 CONFERENCE, 1967 30.00 Gordon.
6. Gray, G. W., MOLECULAR STRUCTURE & THE PROPERTIES OF LIQUID CRYSTALS. 1962 11.00 (SBN 0-12-296556.6) Acad. Pr.
7. Schuele, Donald E., ed. A REVIEW OF THE STRUCTURE & PHYSICAL PROPERTIES OF LIQUID CRYSTALS. 11.50 Chem. Rubber.
8. U.S. Pat. No. 3,322,485 R. Williams - May 30, 1967
9. U.S. Pat. No. 3,540,796, J. E. Goldmacher et al, Nov. 17, 1970
10. U.S. Pat. No. 3,597,044, J. A. Castellano, Aug. 3, 1971
11. U.S. Pat. No. 3,656,834, I. Haller, et al, April 18, 1972
12. U.S. Pat. No. 3,675,987, M. J. Rafuse, July 11, 1972
13. U.S. Pat. No. 3,703,329, J. A. Castellano, Nov. 21, 1972.
14. U.S. Pat. No. 3,731,986, J. L. Fergason, May 8, 1973.

What I claim is:

1. A liquid crystal composition for use in information transmission, storage, handling and display systems consisting essentially of two components; a solute consisting essentially of the strongly positive dielectric anisotropic nematic non-Schiff base compound 4'-cyanophenyl-4-n-heptylbenzoate; and a solvent consisting essentially of a composition of the weakly negative dielectric anisotropic nematic non-Schiff base compounds 4'-n-butylphenyl-4-n-hexyloxybenzoate, 4'-methoxyphenyl-4-n-heptylbenzoate, 4'-n-pentylphenyl-4-n-hexyloxybenzoate and 4'-n-pentylphenyl-3-chloro-4-(4'-n-pentylbenzoyloxy)-benzoate; the strongly positive dielectric anisotropic nematic solute comprising from about two percent to about fifty percent of the composition, the composition having a net positive dielectric anisotropy and exhibiting nematic behavior in the range encompassing normal room temperature and extending below and above normal room temperature and extending below and above normal room temperature to cover usual ambient operating temperatures, and exhibiting electro-optic behavior under nematic conditions within the range of from about 0.1 to about 20.0 volts at 0 to 10 kilohertz in a layer from about $6\mu$ to about $25\mu$ in thickness in an electro-optic display device which comprises the layer of nematic liquid crystal composition between spaced substrates which have electrically conductive elements for applying the voltage through the layer of liquid crystal composition.

2. A liquid crystal composition for use in information transmission, storage, handling and display systems, consisting essentially of two components; generally in the ratio of the amounts stated; a solute consisting essentially of about 0.03 weight parts of the strongly positive dielectric anisotropic nematic non-Schiff base compound 4'-cyanophenyl-4-n-heptylbenzoate; and a solvent consisting essentially of a composition of the following amounts of the weakly negative dielectric anisotropic nematic non-Schiff base compounds, about 0.3 weight parts 4'-n-butylphenyl-4-n-hexyloxybenzoate, about 0.3 weight parts 4'-methoxyphenyl-4-n-heptylbenzoate, about 0.3 weight parts 4'-n-pentylphenyl-4-n-hexyloxybenzoate and about 0.1 weight parts 4'-n-pentylphenyl-3-chloro-4-(4'-n-pentylbenzoyloxy)-benzoate; the composition having a net positive dielectric anisotropy and exhibiting nematic behavior in the range encompassing normal room temperature and extending below and above normal room temperature to cover usual ambient operating temperatures, and exhibiting electro-optic behavior under nematic conditions within the range of from about 0.1 to about 20.0 volts at 0 to 10 kilohetz in a layer from about $6\mu$ to about $25\mu$ in thickness in an electro-optic display device which comprises the layer of nematic liquid crystal composition between spaced substrates which have electrically conductive elements for applying the voltage through the layer of liquid crystal composition.

* * * * *

UNITED STATES PATENT OFFICE
CERTIFICATE OF CORRECTION

Patent No. 4,020,002          Dated April 26, 1977

Inventor(s) Chan S. Oh

It is certified that error appears in the above-identified patent and that said Letters Patent are hereby corrected as shown below:

Col. 1, Line 6 - Delete "of"

Col. 5, Line 39 - After "paragraph", insert --.--

Col. 6, Line 4 - "$\Delta\varepsilon = \varepsilon_\perp - \varepsilon_{||} < 0$" should be --$\Delta\varepsilon = \varepsilon_{||} - \varepsilon_\perp < 0$--

Col. 8, Line 44 - "Examplary" should be --Exemplary--

Col. 9, Line 50 - "C1/195" should be --$C_\perp$--

Col. 9, Line 47 - "Capacitance" should be over column (pf)

Col. 11, Line 15 - "hexyloxybezoate" should be
          --hexyloxybenzoate--

Col. 11, Line 18 - "pentylbenzyloxy" should be
          --pentylbenzoyloxy--

Col. 13, Line 19 - Delete "and extending below and above normal
          room temperature" (second occurrence)

Signed and Sealed this

*Eighth* Day of *November 1977*

[SEAL]

Attest:

RUTH C. MASON          LUTRELLE F. PARKER
*Attesting Officer*          *Acting Commissioner of Patents and Trademarks*